Patented June 6, 1933

1,912,628

UNITED STATES PATENT OFFICE

NORMAN ELLIOTT, OF MIDLAND, MICHIGAN, ASSIGNOR TO THE DOW CHEMICAL COMPANY, OF MIDLAND, MICHIGAN, A CORPORATION OF MICHIGAN

PURIFICATION OF DIHYDRIC PHENOLS

No Drawing.   Application filed September 4, 1931. Serial No. 561,310.

The present invention concerns a new method for purifying and decolorizing dihydric phenols so as to remove various impurities such as oxidation, condensation and colored by-products from the same.

Dihydric phenols are generally recovered from the alkaline reaction mixture in which they are formed by acidifying an aqueous solution of said mixture with a strong mineral acid, extracting the acidified mass with an organic solvent such as ether, and evaporating the solvent so as to separate the phenolic compound therefrom. The crude dihydric phenol so obtained is usually discolored badly and is generally purified through distillation, sublimation or recrystallization from a suitable solvent. Because of the extreme ease with which dihydric phenols are oxidized, purification of such compounds through either a distillation or sublimation operation usually results in a considerable loss of material. The sublimation operation is further disadvantageous in that it involves the use of complicated and expensive apparatus. A satisfactory purification of crude dihydric phenols through recrystallization from a solvent is difficult to attain. I have found, for instance, that crude hydroquinone, as recovered from the reaction mixture formed through the hydrolysis of para-bromo-phenol, could not be purified so as to obtain a white product having the correct melting point even after five recrystallizations of said compound from water.

I have now found that a dihydric phenol may be purified and the product from such purification recovered in excellent yield by distilling such compound along with an organic solvent having a boiling point above 130° C. and in which solvent said phenolic compound is soluble when hot but relatively insoluble when at about room temperature. Among the various solvents applicable for such purification operation may be mentioned xylene, monochloro-toluene, monochloro-xylene and the chlorinated benzenes, e. g. monochloro-benzene, ortho-dichloro-benzene, 1.2.4-trichloro-benzene, etc. The purification of a dihydric phenol through distilling such compound along with a suitable solvent is advantageous over the methods involving purification through distillation or sublimation of the compound alone, in that the presence of such solvent protects the phenolic compound from contact with air and thereby avoids any appreciable loss of material through oxidation. My new method is simple in operation and may be employed in a continuous process by filtering the purified dihydric phenol from the cooled distillate and returning the liquor to the distilling apparatus while replenishing the distilling solution with fresh quantities of crude dihydric phenol from time to time. The present invention, then, consists in a new method of purifying a dihydric phenol, such method being hereinafter fully described and particularly pointed out in the claims.

The following examples point out in detail several of the various ways in which the principle of my invention may be employed, it being understood, however, that such examples are purely illustrative and are not to be construed as a limitation on the invention.

Example 1

In a Claisen distilling flask fitted with a dropping funnel, a thermometer, and a condenser connected with a receiving flask, were placed 655 grams of ortho-dichloro-benzene and 50 grams of brownish colored hydroquinone having the melting point of the pure compound, i. e. 170.5° C. The mixture was distilled at atmospheric pressure, the distillate cooled to about 20° C., the purified hydroquinone filtered therefrom and the mother liquor returned to the distilling flask for redistillation. During the course of such treatment there was collected a total of 10280 grams of distillate and from said distillate there was separated 50.0 grams of hydroquinone. The recovered product was pure white in color and melted at 170.5° C. The recovery of hydroquinone was practically quantitative.

*Example 2*

A solution comprising 50 grams of dark-brownish colored hydroquinone of melting point 167° to 168° C. and 785 grams of 1.2.4-trichloro-benzene was distilled in a way similar to that described in Example 1, the distilled solvent, from which the purified hydroquinone was separated, being returned to the distilling flask from time to time while carrying out the operation. During the course of such treatment there was collected a total of 1060 grams of distillate from which 48 grams of pure white hydroquinone having the melting point 170.5° C. was separated through filtration.

*Example 3*

A solution consisting of 16 grams of dark-brownish colored hydroquinone of melting point 166° to 167° C., 140 grams of sodium acid sulphite and 500 grams of water was evaporated to dryness. The residue was distilled along with ortho-dichloro-benzene in a way similar to that described in Example 1. During the course of said operation, there was collected 3400 grams of distillate from which 14.4 grams of pure white hydroquinone having the melting point 170.5° C. was separated through filtration.

*Example 4*

Using apparatus similar to that described in Example 1, 37 grams of nearly white pyrocatechol of melting point 95° to 98° C. was distilled along with ortho-dichloro-benzene, the purified product being filtered from the distillate and the mother liquor returned to the distilling flask from time to time during the course of the distillation. From a total of 2460 grams of distillate collected, 32 grams of pure white pyrocatechol of melting point 102° to 104° C. was separated through filtration.

*Example 5*

By procedure similar to that described in example 4, 100 grams of pinkish colored resorcinol of melting point 98° to 103° C. was distilled along with ortho-dichloro-benzene. From 6 kilograms of distillate collected there was separated 84 grams of pure white resorcinol having the melting point 108° to 110° C.

In the above examples it will be noted that in Example 1, where nearly pure hydroquinone was distilled along with ortho-di-chloro-benzene, the product was recovered in practically quantitative yield. In Examples 2, 3, 4, and 5, the apparent yields of purified product are lower due largely to impurities present in the crude dihydric phenols employed.

Other modes of applying the principle of my invention may be employed instead of those explained, change being made as regards the method herein disclosed, provided the step or steps stated by any of the following claims, or the equivalent of such stated step or steps be employed.

I therefore particularly point out and distinctly claim as my invention:—

1. In a method of purifying and decolorizing a dihydric phenol, the steps which consist in distilling such compound along with an organic solvent having a boiling point above 130° C. which is capable of dissolving the dihydric phenol when hot, but relatively incapable of dissolving said compound when cold, and separating the purified dihydric phenol from the distillate.

2. In a method of purifying and decolorizing a dihydric phenol, the steps which consist in distilling such compound along with a chloro-benzene and separating the purified dihydric phenol from the distillate.

3. In a method of purifying and decolorizing a dihydric phenol, the steps which consist in distilling such compound along with one of the following group of organic solvents:—monochloro-benzene, ortho-dichloro-benzene and 1.2.4-trichloro-benzene, and separating the purified dihydric phenol from the distillate.

4. In a method of purifying and decolorizing a dihydric phenol, the steps which consist in distilling such compound along with an organic solvent having a boiling point above 130° C. which is capable of dissolving the dihydric phenol when hot, but relatively incapable of dissolving said compound when cold, separating the purified dihydric phenol from the distillate, returning the distilled solvent to the distilling solution and replenishing the distilling mixture with additional quantities of crude dihydric phenol from time to time.

5. In a method of purifying and decolorizing hydroquinone, the steps which consist in distilling the same along with an organic solvent capable of dissolving hydroquinone when hot, but relatively incapable of dissolving said compound when cold and in which solvent the hydroquinone exerts an appreciable vapor pressure at the boiling point of the solution, and separating purified hydroquinone from the distillate.

6. In a method of purifying and decolorizing hydroquinone, the steps which consist in distilling said compound along with a chloro-benzene and separating the purified hydroquinone from the distillate.

7. In a method of purifying and decolorizing resorcinol, the steps which consist in distilling the same along with an organic solvent having a boiling point above 130° C. which is capable of dissolving resorcinol when hot, but relatively incapable of dissolving said compound when cold, and separating the purified resorcinol from the distillate.

8. In a method of purifying and decolorizing resorcinol, the steps which consist in distilling said compound along with a chloro-benzene and separating the purified resorcinol from the distillate.

9. In a method for purifying and decolorizing pyrocatechol, the steps which consist in distilling said compound along with an organic solvent having a boiling point above 130° C. which is capable of dissolving pyrocatechol when hot, but relatively incapable of dissolving said compound when cold, and separating the purified pyrocatechol from the distillate.

10. In a method for purifying and decolorizing pyrocatechol, the steps which consist in distilling said compound along with a chloro-benzene and separating the purified pyrocatechol from the distillate.

Signed by me this 31st day of August, 1931.

NORMAN ELLIOTT.